United States Patent
Colette

[15] 3,693,073
[45] Sept. 19, 1972

[54] MULTIPLE FUNCTION TESTING DEVICE FOR INTERNAL COMBUSTION ENGINE

[72] Inventor: Michael Colette, Saint Clair Shores, Mich. 48080

[73] Assignee: Orbit Laboratories, Inc., Chicago, Ill.

[22] Filed: Oct. 23, 1970

[21] Appl. No.: 83,357

[52] U.S. Cl..............................324/16 R, 324/169
[51] Int. Cl..............................................F02p 17/00
[58] Field of Search............324/16 T, 16 R, 169, 15; 315/241 R, 241 S, 268, 276; 340/268; 73/116–118

[56] References Cited

UNITED STATES PATENTS

| | | | |
|---|---|---|---|
| 2,908,859 | 10/1959 | Moehring | 324/16 T |
| 3,042,835 | 7/1962 | Badger | 324/16 T |
| 3,573,609 | 4/1971 | Vaher | 324/16 T |

OTHER PUBLICATIONS

D. H. Sweet – Simplet Tachometer/Dwellmeter – Radio Electronics – August, 1966 – pp. 44 & 45

Primary Examiner—Michael J. Lynch
Attorney—Silverman & Cass

[57] ABSTRACT

A multiple function device has three circuits with a common control. One circuit is an oscillator which charges a condenser that is discharged through a gaseous discharge lamp by the sparking of a spark plug to give a stroboscopic timing light; one circuit is an ohmmeter which averages the values of voltage for dwell time and open circuit time to give percentage of cam dwell; and another circuit is an averaging meter which provides a voltage that is proportional to the number of times that the breaker points open. In the latter two instances the meter is calibrated with scales that read dwell time and R.P.M. directly.

10 Claims, 1 Drawing Figure

PATENTED SEP 19 1972　　　3,693,073
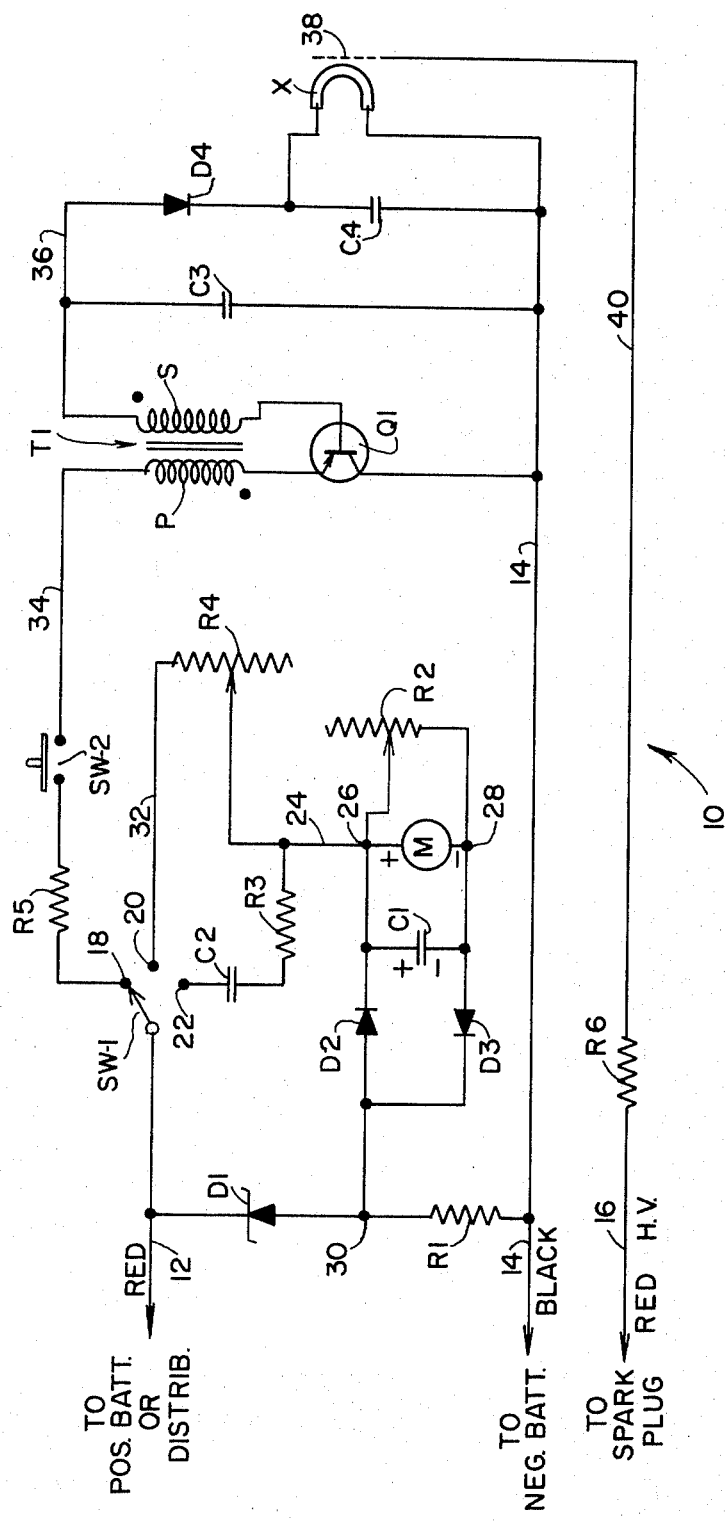
INVENTOR
MICHAEL COLETTE
BY
Silverman & Cass
ATTYS.

MULTIPLE FUNCTION TESTING DEVICE FOR INTERNAL COMBUSTION ENGINE

FIELD AND BACKGROUND OF THE INVENTION

The invention relates to devices which are used for testing internal combustion engines. The primary functions which are capable of being executed by the device of the invention are to operate as a timing light, as a tachometer and as a cam-dwell angle meter.

The primary quality of the invention is its simplicity and its totally fool-proof character.

Former devices which performed the functions of the invention were large, cumbersome and expensive. Many had dials to adjust, batteries to be connected, computations to make. The instant invention is pre-calibrated and has no adjustments to be made once the device has been set up.

Through the use of this device it is possible to locate worn bushings, plates, shafts and bearings. It permits carburetors to be set up for maximum efficiency whether points are corroded or pitted. It indicates the correct settings for external adjustment type distributors. It locates deflective spark plugs. It permits setting of engines to correct R.P.M. for different conditions. It is a valuable aid for engine tune-ups and precise timing.

SUMMARY OF THE INVENTION

In a single case there is provided a timing light, tachometer and cam-dwell angle meter. A single switch controls the setting of the device to any one of three circuits. One circuit includes an oscillator which charges a storage condenser that is discharged through a gaseous discharge lamp by the sparking of a spark plug to give a brilliant light for use in timing. One circuit is an ohmmeter which responds to the time of dwell and open time of the breaker points of a distributor thereby giving a percentage of dwell time. The meter of the circuit is calibrated to read zero for open circuit and full scale when the points are closed. A third circuit is an averaging meter which responds proportionally to the number of times that the breaker points open or close to give an average value proportional to R.P.M.

BRIEF DESCRIPTION OF THE DRAWING

The single FIGURE is a circuit diagram of an instrument which is constructed according to the invention and all contained within a single case.

DESCRIPTION OF THE PREFERRED EMBODIMENT

The circuit diagram illustrates the testing device of the invention which is designated generally by the reference numeral 10. Three electrical leads are provided, these being the leads 12, 14 and 16 suitably colored for identification as indicated in the diagram. The lead 12 is adapted to be connected to the positive battery terminal of the internal combustion engine being tested or to the primary terminal of the distributor; the lead 14 is adapted to be connected to the negative terminal of the battery; and the lead 16 is a high tension lead adapted to be connected to a spark plug wire, typically that of spark plug number one. Between the leads 12 and 14 there is connected a zener diode D1 in series with the resistor R1. The lead 12 also extends to the arm of the three-way switch SW1. This switch SW1 is adapted to be manually moved in any one of three positions, depending upon the use to which the instrument is being put.

The terminal 18 is used when the instrument 10 will be employed as a timing light; the terminal 20 is used when the instrument 10 is being employed as a cam-dwell angle meter; and the terminal 22 is used when the instrument 10 is being used as a tachometer.

Considering first the terminal 22, this terminal connects through a capacitor C2 and series resistor R3 to the lead 24 which is the positive terminal 26 of the ammeter M. A capacitor C1 is connected from the positive terminal 26 across the meter M to the negative terminal 28. A variable resistor R2 is also connected across the meter M. The diodes D2 and D3 are connected from the respective terminals 26 and 28 to the point 30 between the zener diode D1 and the resistor R1. They are poled as shown in the diagram.

Considering next the terminal 20, this terminal is connected by the lead 32 to the variable resistor R4 and through the wiper of that resistor to the lead 24.

Considering finally the terminal 18, this terminal connects to the lead 34 through a series resistor R5 and the momentary contact switch SW2 to the primary winding P of the transformer T1. The primary winding P connects through the emitter-collector electrodes of the transistor Q1 to the lead 14. The secondary winding S of the transformer T1 is connected at its bottom end to the base of the transistor Q1, its top end being connected to the lead 36. The lead 36 is connected in series with the diode D4 to one terminal of the xenon gaseous discharge lamp X, the other terminal of the lamp X being connected to the lead 14. The capacitor C3 is connected across the leads 36 and 14, while the capacitor C4 is connected across the terminals of the xenon lamp X. An external capacitively coupled electrode 38 for aiding in the ignition of the lamp X is connected by the lead 40 through the series resistor R6 to the lead 16.

When it is desired to utilize the instrument 10 as a timing light, the xenon lamp is flashed synchronously with one of the spark plugs. This stroboscopic light is then directed against the timing marks of the flywheel or the harmonic balancer, depending upon the kind of internal combustion engine that is being tested. The distributor locking screw is loosened and the distributor can be rotated manually until the position of the timing marks is in accordance with the manufacturer's specification, or as desired. At this point the distributor is locked in place.

The circuit which is used for this activity is that which is put into play by turning the arm of the switch SW1 to the terminal 18 and depressing the momentary contact switch SW2. The resistor R5 functions as a current limiting resistor. The transformer T1 and the transistor Q1 together form an oscillator together with the capacitor C3 to provide a signal for charging up the storage capacitor C4. In the practical circuit, the transformer T1 was an economical radio loudspeaker output transformer reversed so that its original output winding was the primary winding P and its original input winding was the secondary winding S. The connection to the transistor Q1 enables the transistor to switch the current on and off in the primary winding P giving the desired oscillation. The constants of the circuit were chosen to provide a frequency of about 1,500 hertz. The excitation for the transistor Q1 is derived from the secondary winding S which is connected to the base with phasing such that the currents are in opposition. The capacitor C3 provides a low impedance return path for the 1,500 hertz oscillatory signal.

The signal produced by the oscillator is rectified by the diode D4 and charges up the condenser C4 to a high voltage, say of the order of 300 to 400 volts, which is just insufficient to ionize the xenon lamp X. The connections of the circuit are made with the lead 12 connected to the positive terminal of the battery, the lead 14 is connected to the negative terminal of the battery, while the lead 16 is connected to a spark plug wire. Under these conditions, each time that the spark plug fires, there will be a high voltage field produced between the electrode 38 and the lamp X, which together with the voltage already existing due to the charge on the capacitor C4 is sufficient to discharge the lamp X. At this point, the charge on the condenser C4 is dumped into the lamp resulting in a high intensity gaseous discharge. The resistor R6 in series with the lead 16 provides a voltage divider action acting together with the distributed capacity of the lead. This reduces the steepness of the spark plug pulse to prevent arc-over and to reduce the insulation requirements of the leads 16 and 40.

When it is desired to use the instrument 10 as a tachometer or a cam-dwell angle testing meter, the high tension lead 16 is not used. The lead 12 is connected to the point side of the primary of the distributor and the lead 14 is connected to the negative side of the battery or to ground.

When used for dwell angle testing, the arm of the switch SW1 is connected to the terminal 20, and effectively connects the resistor R4 in series with the meter M and the resistor R1. The resistor R1 has voltage developed in it which is limited by the zener diode D1 so that in effect there is an ohmmeter circuit. When the points of the distributor are open, the voltage is zero, and when the points are closed, the voltage is maximum. The meter M is adjusted to read full scale for the condition of the points being open by adjusting the resistor R4. The resistor R2 is a shunt to compensate for the type of meter used. With the points opening and closing, the meter M will assume an intermediate position which is a function of the percentage of time that the points are closed, which in effect is the dwell time. The meter has a scale which is calibrated to give this time, and the adjustment can be made to change it simply by adjusting the breaker points.

In the case that the instrument 10 is used as a tachometer, the connections of the leads 12, 14 and 16 are the same as when it is used to measure dwell time. The arm of the switch SW1 is now engaged with the terminal 22. Under these conditions, the resistor R3 and condenser C2 in series with the meter M function as a differentiator, to generate a series of pulses of substantially fixed amplitude and width, depending upon the time constant of the RC combination. These pulses are positive and negative, occurring when the points open and close. The negative signals are eliminated by the arrangement of the diodes D2 and D3 and the positive pulses are integrated by the high capacitance capacitor C1 which is across the meter M. This produces an average d.c. value which is read by the meter. The greater the number of pulses, the higher the current measured by the meter. The meter is thus calibrated in terms of R.P.M. with different scales for the different number of cylinders.

Some typical values for a practical circuit are as follows:

R1 — 330 ohms
R2 — 10K ohms for a meter having 1,000 ohms resistance.
   1K ohms for a meter having 100 ohms resistance.
R3 — 180 ohms
R4 — 10K ohms
R5 — 1.6 ohms
C1 — 160 microfarads
C2 — 1 microfarad
C3 — 0.01 microfarad
C4 — 2.2 microfarads The zener diode had a break-down voltage of 8.2 volts.

The instrument 10 is versatile in that many tests of an internal combustion engine can be made using the three combined circuits for obtaining the desired information.

What is desired to secure by Letters Patent of the United States is:

1. Apparatus for testing an internal combustion engine by measuring distributor timing, cam dwell and R.P.M., said apparatus comprising: a cam dwell measuring means and a tachometer means, both said means each having an input terminal for connection to the distributor of the engine, an output terminal for connection to the engine ground, a single meter circuit means connected between both said cam dwell measuring means and said tachometer means and said output terminal said cam dwelling measuring means including first circuit means connected to said meter circuit means to supply thereto a signal proportional to the percentage of time that the engine breaker points are open circuit; said tachometer means including second circuit means connected to said meter circuit means to supply thereto a signal proportional to the number of times that the braker points open per unit time; said first and second circuit means being connected within said apparatus to operate substantially independent of each other; and an engine timing light circuit having a first terminal for connection to the positive battery terminal of the engine, for supplying exclusive d.c. power to said timing light circuit, a second terminal for connection to a spark plug of the engine, a lamp to be periodically ignited by said timing light circuit, first coupling means coupling said lamp across said first and output terminals and for applying to said lamp pulsed d.c. energy of relatively high frequency and of a value below the ignition point of said lamp, second coupling means, including voltage dropping means for protection of the entire apparatus, connected to said second terminal and capacitively coupled to said lamp for supplying pulsed energy of sufficient magnitude in combination with the said high frequency value to ignite said lamp in synchronism with the firing of a spark plug; a test lead for connection to one of the engine positive battery terminal and the distributor of the engine and manual switching means for sequential connection of any one of said input and first terminals to said test lead.

2. Apparatus according to claim 1 in which said first coupling means of said timing light circuit includes an oscillator consisting of a transformer with primary and secondary windings and an electronic switch connected to both windings and turned on and off by pulsed d.c. signals from said secondary winding.

3. Apparatus according to claim 2 in which said electronic switch consists of a transistor having its base connected to one end of said secondary winding and its emitter connected to one end of said primary winding.

4. Apparatus according to claim 1 in which said first circuit means of said cam dwell measuring means comprises resistive means in series between said input terminal and one side of said meter circuit means, and there further is provided voltage regulator means connected between said test lead and said output terminals.

5. Apparatus according to claim 4 in which said second circuit means of said tachometer means comprises a differentiating circuit connected to said input terminal and an integrating circuit connected to said meter circuit means and responsive to the output from said differentiating circuit.

6. Apparatus according to claim 5 in which said first coupling means of said timing light circuit includes an oscillator consisting of a transformer with primary and secondary windings and an electronic switch connected to both windings and turned on and off by pulsed d.c. signals from said secondary winding.

7. Apparatus according to claim 6 in which said electronic switch consists of a transistor having its base connected to one end of said secondary winding and its emitter connected to one end of said primary winding.

8. Apparatus according to claim 1 in which said second circuit means of said tachometer means comprises a differentiating circuit connected to said input terminal and an integrating circuit connected to said meter circuit means and responsive to the output from said differentiating circuit.

9. Apparatus according to claim 8 in which said first coupling means of said timing light circuit includes an oscillator consisting of a transformer with primary and secondary windings and an electronic switch connected to both windings and turned on and off by pulsed d.c. signals from said secondary winding.

10. Apparatus according to claim 9 in which said first circuit means of said cam dwell measuring means comprises resistive means in series between said input terminal and one side of said meter circuit means, and there further is provided voltage regulator means connected between said test lead and said output terminals.

* * * * *

PO-1050
(5/69)

UNITED STATES PATENT OFFICE
CERTIFICATE OF CORRECTION

Patent No. 3,693,073          Dated September 19, 1972

Inventor(s) Michael Colette

It is certified that error appears in the above-identified patent and that said Letters Patent are hereby corrected as shown below:

Column 3, line 46, change "open" to --closed--.

Signed and sealed this 11th day of June 1974.

(SEAL)
Attest:

EDWARD M. FLETCHER, JR.          C. MARSHALL DANN
Attesting Officer          Commissioner of Patents